United States Patent [19]
Knoblauch et al.

[11] 4,452,772
[45] Jun. 5, 1984

[54] METHOD OF PRODUCING SULFUR FROM $SO_2$-CONTAINING GASES

[75] Inventors: Karl Knoblauch; Ekkehard Richter, both of Essen; Horst Grochowski, Oberhausen; Jürgen Schwarte, Essen, all of Fed. Rep. of Germany

[73] Assignee: Foster Wheeler Energy Corporation, Livingston, N.J.

[21] Appl. No.: 408,656

[22] Filed: Aug. 16, 1982

Related U.S. Application Data

[63] Continuation of Ser. No. 286,542, Jul. 24, 1981, abandoned, which is a continuation of Ser. No. 124,787, Feb. 25, 1980, abandoned.

[30] Foreign Application Priority Data

Jun. 12, 1979 [DE] Fed. Rep. of Germany ....... 2923704

[51] Int. Cl.$^3$ .............................................. C01B 17/02
[52] U.S. Cl. .................................... 423/569; 423/570; 423/573 G; 423/574 R
[58] Field of Search ........... 423/563, 569, 570, 574 R, 423/574 L, 574 G, 573 G

[56] References Cited

U.S. PATENT DOCUMENTS

| 1,771,480 | 7/1930 | Benner et al. | 423/570 |
| 1,917,685 | 7/1933 | Bacon et al. | 423/570 |
| 4,117,100 | 9/1978 | Hellmer et al. | 423/569 |
| 4,207,304 | 6/1980 | Beavon | 423/569 |

OTHER PUBLICATIONS

Kellog, H. H., "Metallurg Trans", V.Z. Aug. 1979, pp. 2161–2169.

Primary Examiner—Gregory A. Heller
Attorney, Agent, or Firm—Marvin A. Naigur; Robert D. Bajefsky

[57] ABSTRACT $SO_2$-containing gas is made to contact a carbon-containing material to reduce the gas to a gas mixture containing sulfur and also containing $H_2S$ and $SO_2$ in a volume ratio of 2:1. The sulfur is then removed by condensation and the remaining gas mixture subjected to a Claus-process treatment to obtain additional sulfur from it.

5 Claims, 1 Drawing Figure

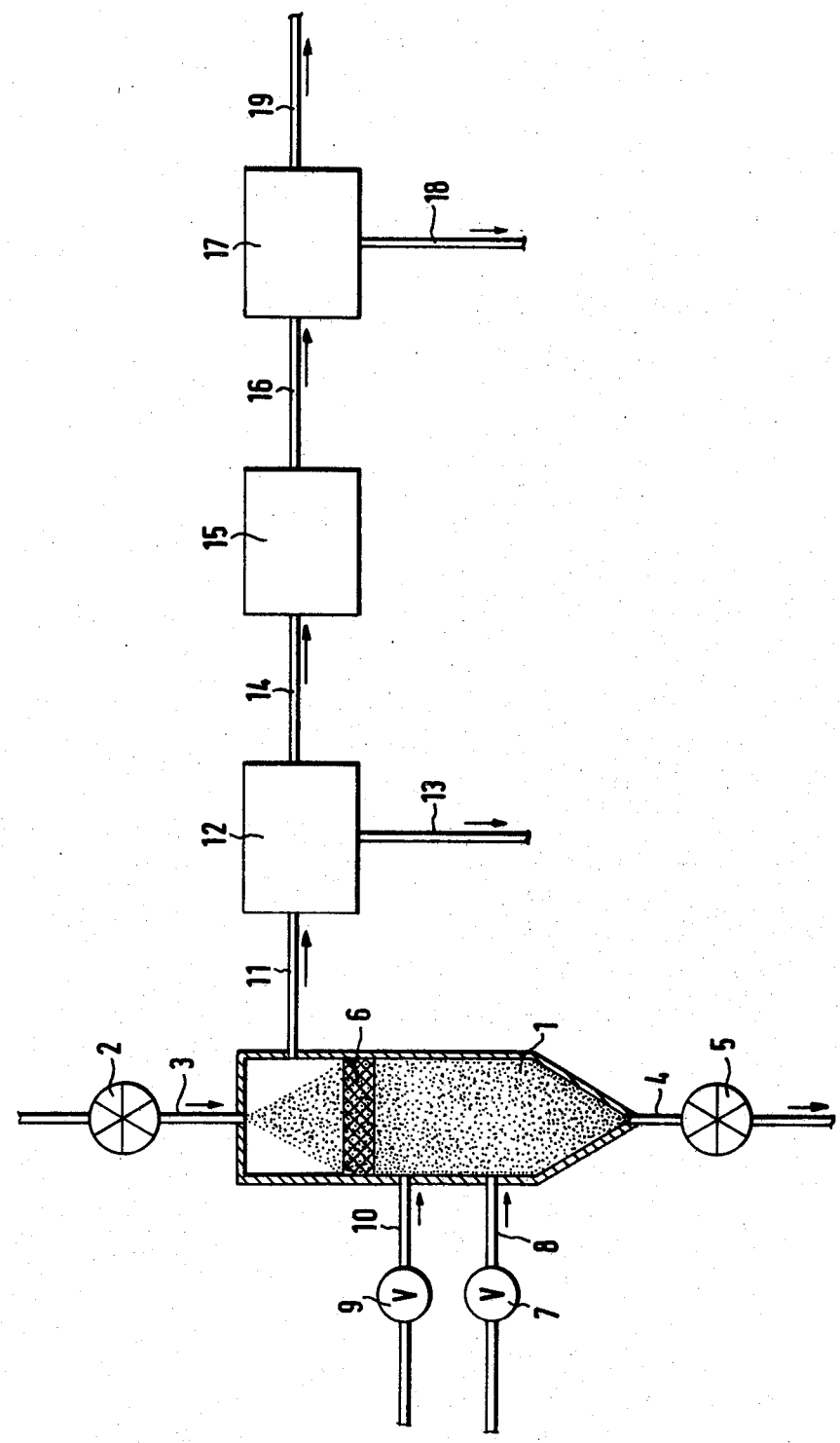

METHOD OF PRODUCING SULFUR FROM SO$_2$-CONTAINING GASES

This is a continuation of application Ser. No. 286,542, filed July 24, 1981, now which is a continuation of application Ser. No. 124,787, filed Feb. 25, 1980, now abandoned.

BACKGROUND OF THE INVENTION

This invention relates to the production of sulfur, and in particular to the production of sulfur from SO$_2$-containing gases.

SO$_2$-containing gases, especially those having an SO$_2$-content of 5 and of 95% by volume, are obtained in the chemical and petrochemical industries. They are also found in operation of the flue-gas desulfurizing installations of power-generating stations and in sintering installations. The other components of these gases are usually SO$_2$, N$_2$ and water vapor. As a rule, these gases are treated to recover their SO$_2$ content as sulfur.

For this purpose it is known to contact SO$_2$-containing gases with other gases having a reduction effect, in the 900°–1150° C. temperature range, so as to obtain a gas mixture in which H$_2$S and SO$_2$ are present in a ratio of 2:1. The thus obtained gas mixture is then converted according to the Claus process to obtain sulfur. Using a three-stage Claus system, it is possible to recover up to 94% of the SO$_2$ in form of sulfur. However, this process requires the use of large quantities of reduction gases which are often not, or not readily, available.

Another known process is to reduce SO$_2$-containing gases to sulfur with the use of anthracite. This eliminates the need for reduction gases but has the disadvantage that the SO$_2$ is reduced to sulfur only up to about 75%.

SUMMARY OF THE INVENTION

It is an object of the invention to overcome the prior-art disadvantages.

A more particular object is to provide an improved method of producing sulfur from SO$_2$-containing gases, which is free of the prior-art disadvantages.

A still more specific object is to provide a method of obtaining sulfur from SO$_2$-containing gases with the use of carbon-containing substances as the reduction agent, which method is so improved that SO$_2$ reduction to sulfur reaches levels in excess of 90%.

Pursuant to the invention these objects, and still others which will become apparent hereafter, are achieved in a method which, briefly stated, may comprise the steps of contacting the SO$_2$-containing gases with a carbon-containing material to effect their reduction to a gas mixture containing sulfur and H$_2$S and SO$_2$ in a volume ratio of 2:1; removing sulfur from the gas mixture by condensation; and subjecting the residual gas mixture containing H$_2$S and SO$_2$ to a Claus-process treatment to obtain additional sulfur therefrom.

Resort to the present invention makes it possible to reduce 90% or more of the SO$_2$ content in a gas to sulfur, using carbon-containing material as the reduction agent. The reason for this high efficiency results from the fact that in the first stage the SO$_2$ reduction using carbon-containing material, can be so controlled—by careful maintenance of certain reduction temperatures—that in addition to the sulfur a gas is obtained having a 2:1 ration of H$_2$S to SO$_2$ which is desirable for the Claus process.

According to the invention the SO$_2$ reduction on the carbon-containing material is carried out at temperatures of 850°–950° C., resulting in a reduction to sulfur of about 20–50% of the SO$_2$. By setting and maintaining a certain temperature during this operation, the aforementioned desired volume ratio of 2:1 is formed at the same time the reduction to sulfur proceeds; the higher this temperature is within the 850°–950° C. range, the greater the proportion of H$_2$S in the gas mixture, and vice versa. The gases are advantageously passed through the reactor in downward direction and in counterflow to the carbon-containing material, at a flow speed of about 0.05–1 m/sec. The dwell time of the gases in the reaction zone should be about 0.01–0.5 sec.

The reduction temperature to which the feed gases are subjected during exposure to the carbon-containing material, is to some extent dependent on the initial SO$_2$ concentration in the feed gas, on the quantity of water vapor which is present and on the particular carbon-containing material being used. Some carbon-containing materials (e.g., charcoal) react much more readily than others (e.g., certain types of coke); in the case of readily reacting materials the reaction temperature may be chosen to be somewhat lower than otherwise. Anthracite has been found to be particularly useful for the purposes of this invention.

According to the invention a reaction zone having an 850°–950° C. temperature is created in the carbon-containing material by admitting controlled quantities of air into the material upstream of the point of feed-gas admission. It is characteristic for the present invention that this results in the development—in the carbon-containing material and starting upstream of the feed-gas admission point—of a zone having generally a length (height) of about 10–30 cm and in which the material has a temperature of 850°–950° C. The specific desired temperature is selected by appropriate metering of the admitted air which amounts to between about 1/6–1/10 of the feed gas volume, preferably ⅛ thereof.

As already explained, the exact selection and maintenance of a certain specific reduction temperature in the carbon-containing material is of great importance for the desired reaction. For this reason it is advisable to admit the feed gases to the reactor in preheated condition, so as to facilitate the regulation and adjustment of the reaction temperature. Preheating of the feed gases to 350°–600° C. is particularly advantageous and can be effected by means of a heat exchanger used anyhow in the system, or else by the admission of hot combustion gases directly into the feed gases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic view, illustrating an installation for carrying out the invention.

DESCRIPTION OF THE PREFERRED EMBODIMENTS

The drawing will hereafter be described jointly as to the illustrated structure as well as with respect to an example of carrying out the method.

The installation for carrying out the inventive method included a fluidized-bed reactor 1 with a diameter of e.g., 1.5 m and a total height of 3 m. It contained anthracite particles having a particle size range of between 3 and 10 mm. The reactor received an hourly charge of 150 kg anthracite through inlet pipe 3 and metering valve 2, and 130 kg/h of spent anthracite were removed from the reactor via pipe 4 and metering valve 5. The temperature of the anthracite charge contained in the reactor 2 increased from ambient temperature at the valve 2 to about 900° C. in the reduction zone 6, and decreased below the reduction zone 6 to a level of about 150° C. at the valve 5. The vertical length of the reduction zone was 35 cm.

Flue gas was admitted into the lower part of the reactor via line 8 and valve 7; at the same time, air was admitted at about mid-height of the reactor via line 10 and valve 9.

Gases were removed from reactor 1 via line 11 and passed through a cooler 12 in which they were cooled to about 130°–200° C. Sulfur condensed in the cooler 12 ran off in liquid form via line 13 to be collected in a non-illustrated receptacle. The gas leaving cooler 12 via line 14 was then passed through a Claus furnace 15 (one shown but more may be used) the catalyst of which (as usual ferrous bauxite) was heated to 350° C.

The gas mixture forming as a result of the preceding treatment was passed from the Claus furnace 15 to a cooler 17 where it was cooled down, causing sulfur to condense; this liquid sulfur was passed via line 18 to the aforementioned non-illustrated receptacle. The remaining gas was vented from cooler 18 via line 19.

The actual operating parameters of the example were as follows:

650 m$^3$/h of flue gas were preheated to 450° C. and then admitted into the reactor 1 via line 8. The $SO_2$ concentration in this preheated feed gas was about 28 vol/% corresponding to 184 kg of sulfur. The reduction zone was set for a maximum temperature of 910° C. by metered admission of air. The feed gas flowed through the reduction zone with a dwell time of 0.2 sec and left the reactor via line 11 at a temperature of 650° C.; it was cooled down to 160° C. in cooler 12 with a resultant recovery of 36.8 kg sulfur per hour.

The remaining gas, having a $H_2S$ and $SO_2$ volume ratio of 2:1, flowed sequentially through two Claus furnaces which were operated at 350° C. The gas issuing from the second Claus furnace flowed via line 16 into the cooler 17 where its temperature was reduced to 120° C.; resulting in condensation of 140 kg sulfur per hour which flowed off via line 18. The waste gas leaving cooler 17 via line 18 was analyzed and found to contain about 7.3 S/h in form of sulfur-containing compounds, especially in form of COS.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing sulfur from gases containing water vapor and $SO_2$ by reduction of the $SO_2$ at elevated temperature, comprising the steps of introducing the water-vapor and $SO_2$-containing gases into a reaction zone containing solid carbonaceous material; introducing air into the carbonaceous material at a point upstream of the location at which said gases are introduced, the air being introduced in sufficient quantity to cause a zone of the carbonaceous material to reach a temperature of about 850° to 950° C.; removing said gases from said carbonaceous material upstream from said zone; removing sulfur from the removed gases by condensation leaving residual gas mixture containing $H_2S$ and $SO_2$ in a volume ratio of 2:1; and subjecting the residual gas mixture containing $H_2S$ and $SO_2$ to a Claus-process treatment to obtain additional sulfur therefrom.

2. A method as defined in claim 1, wherein said air is introduced in sufficient quantity to cause said zone of carbonaceous material to reach a temperature close to 900° C.

3. A method as defined in claim 1, wherein the dwell time of the gas in contact with the carbonaceous material is about 0.01 to 0.5 sec.

4. A method as defined in claim 1; and further comprising heating the $SO_2$-containing gases to a temperature between 350°–600° C. before said gases are introduced into said reaction zone.

5. A method as defined in claim 4, wherein said heating is carried out by admixing hot combustion gases with the $SO_2$-containing gases.

* * * * *